(12) United States Patent
Chung

(10) Patent No.: US 7,185,670 B1
(45) Date of Patent: Mar. 6, 2007

(54) WALL FAUCET

(76) Inventor: Chiu-Chih Chung, No. 31, Lane 275, Sec. 4, Lu Ho Rd., Lu Kan Chen, Chunghua Hsien (TW)

( * ) Notice: Subject to any disclaimer, the term of this patent is extended or adjusted under 35 U.S.C. 154(b) by 0 days.

(21) Appl. No.: 11/143,624

(22) Filed: Jun. 3, 2005

(51) Int. Cl.
*F16L 5/00* (2006.01)
(52) U.S. Cl. .................. 137/360; 137/801; 4/678; 285/364; 285/368; 285/384
(58) Field of Classification Search ........... 137/360, 137/801; 4/678; 285/354, 366, 384
See application file for complete search history.

(56) References Cited

U.S. PATENT DOCUMENTS 2,808,069 A * 10/1957 McCurdy ............... 137/236.1
3,136,570 A * 6/1964 Lee ........................... 285/193
5,595,212 A * 1/1997 Warshawsky et al. ...... 137/360

* cited by examiner

*Primary Examiner*—A. Michael Chambers
(74) *Attorney, Agent, or Firm*—Troxell Law Office, PLLC

(57) ABSTRACT

An improved wall faucet, which is to put through the locking ends on both sides of water faucet to connect the locking units and position the water faucet on the shutter of the granite counter; in addition, the locking screw cap would be jointed closely with the non-returning pad after being locked on the locking end of the water faucet to prevent the water's effusion from the locking end. In accordance with the structure, because the locking unit is designed direcly on the locking end to make water can be guided directly and vertically to the locking screw cap and perforation and position the water faucet on the shutter of the granite counter, the interval between the shutter and wall can be shortened properly for saving space and costs in connection materials.

2 Claims, 4 Drawing Sheets

WALL FAUCET

BACKGROUND OF THE INVENTION

1. Field of the Invention

An improved wall faucet, in which, the water faucet is assembled with two locking ends and two locking units to make the water directly flow from the locking screw cap and inner thread portion of the locking units vertically, so as to shorten the interval between the shutter and wall after the water faucet is fixed on the shutter of a granite counter for good appearance and saving space and costs in raw materials.

2. Description of the Prior Art

Generally, the pipeline establishment should be finished in advance before the completion of the buildings, and some proper space would be left on the shutter of the granite counter in advance, so as to make that the pipeline system can be connected with the rear of the granite counter smoothly; and the common prior wall faucet 1, referring to FIG. 1, whose main body 1 is put through from the shutter S of granite counter to the pipeline setting position with the feed locking end 11, and the locking end 11 into the end of the shutter S generally is designed as a 1"1¼" strip type. Therefore, that would results in larger interval between the locking end 11 and the setting position of the feed pipe 2. Nevertheless, a proper interval must be kept between the shutter S of the granite counter and wall W. Not only are the materials for connection wasted, but also is the space occupied for the larger interval L1 besides some deficiencies in use.

SUMMARY OF THE INVENTION

The main purpose of the present invention is to provide an improved wall faucet, in which, the water faucet is assembled with two locking ends and two locking units to make the water directly flow from the locking screw cap and inner thread portion of the locking units vertically, so as to shorten the interval between the shutter and wall after the water faucet is fixed on the shutter of a granite counter for good appearance and saving space and costs in raw materials;

The secondary purpose of the prevent invention is to provide an improved wall faucet. In which, more space of the granite counter outside the shutter can be saved by means by shortening the interval between the shutter and the wall.

DETAILED DESCRIPTION OF THE PREFERRED EMBODIMENTS

Figure 1:
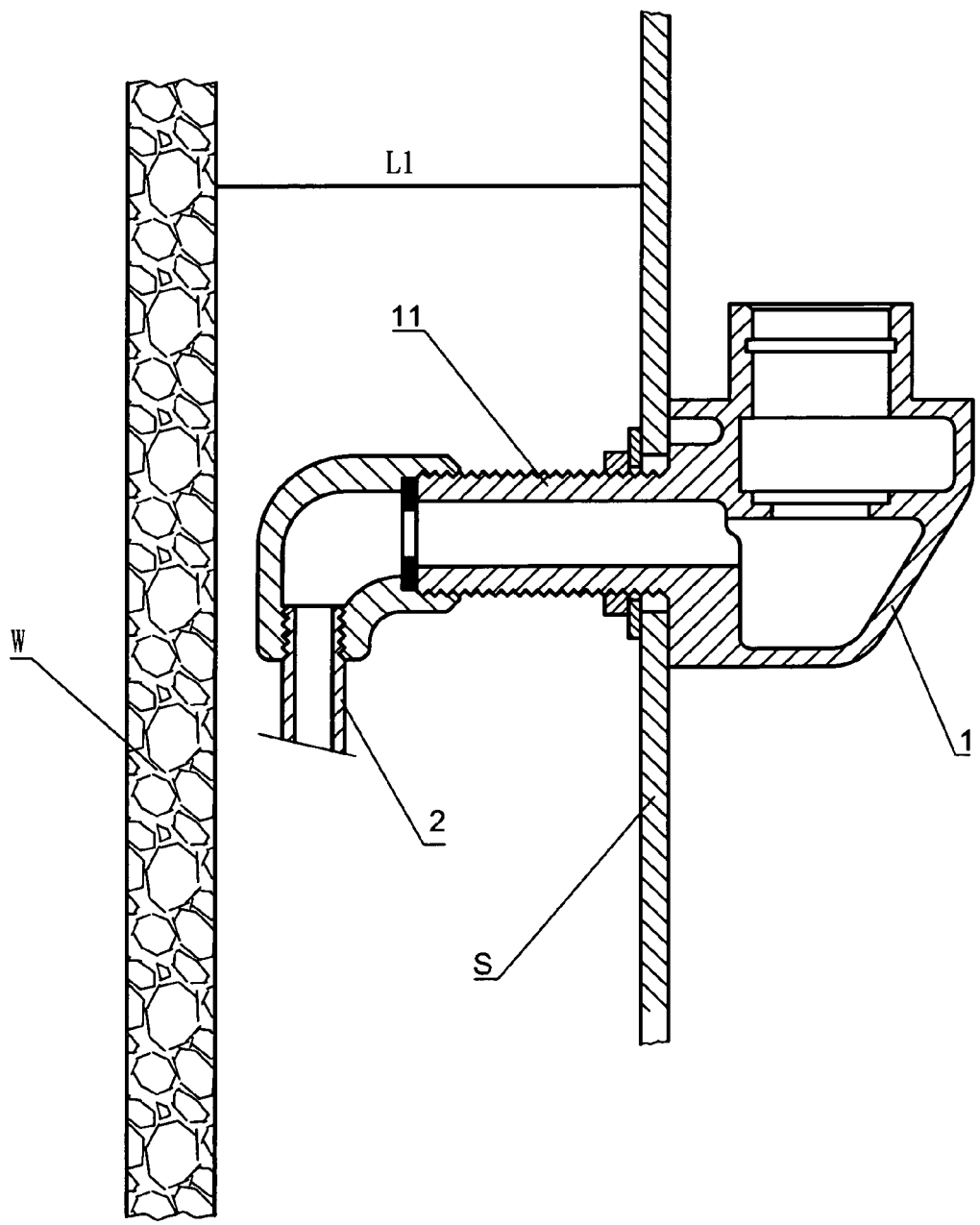
FIG. 1: the plane cutaway view of the prior art.
Figure 2:
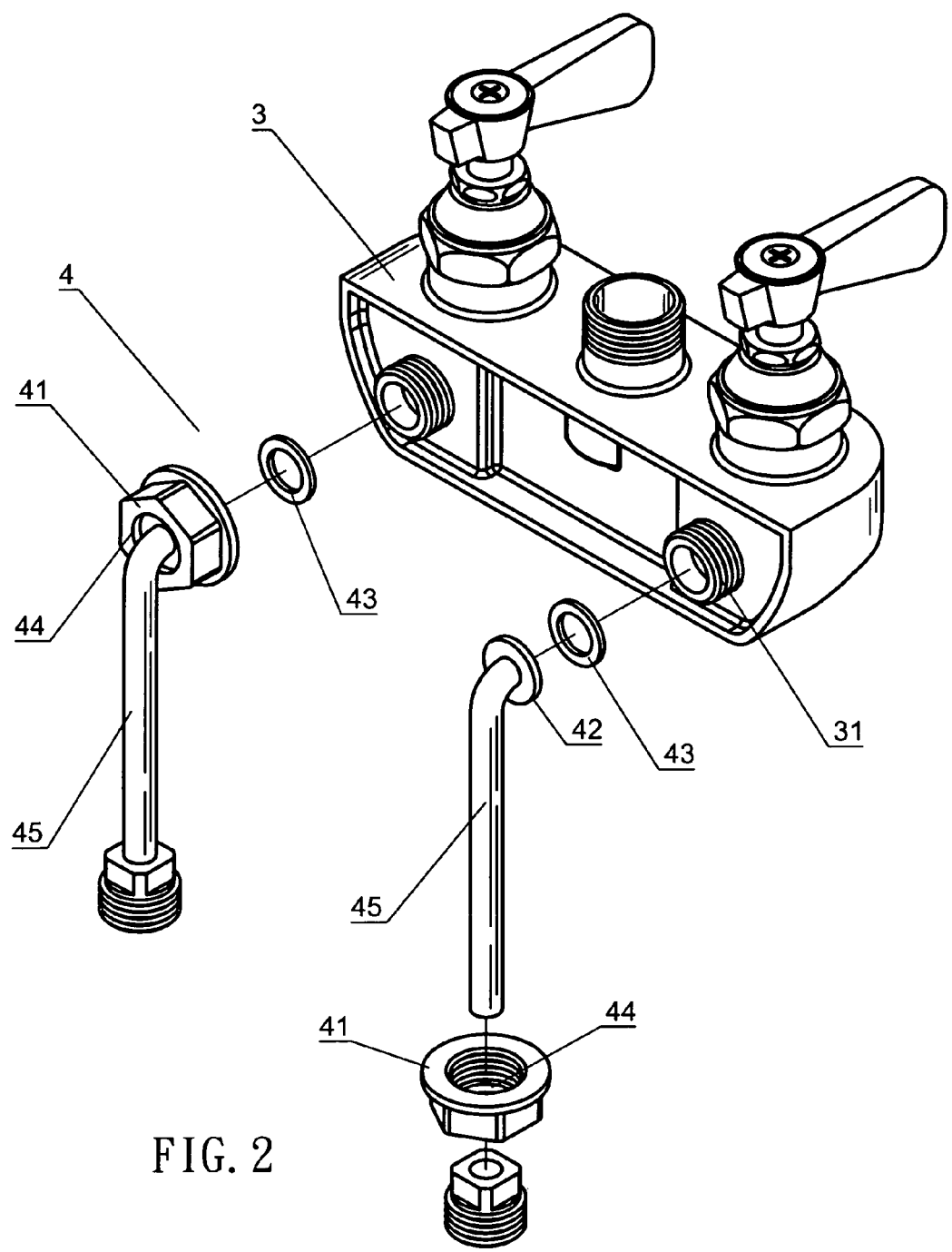
FIG. 2: the three-dimensional exploded view of the present invention.
Figure 3:
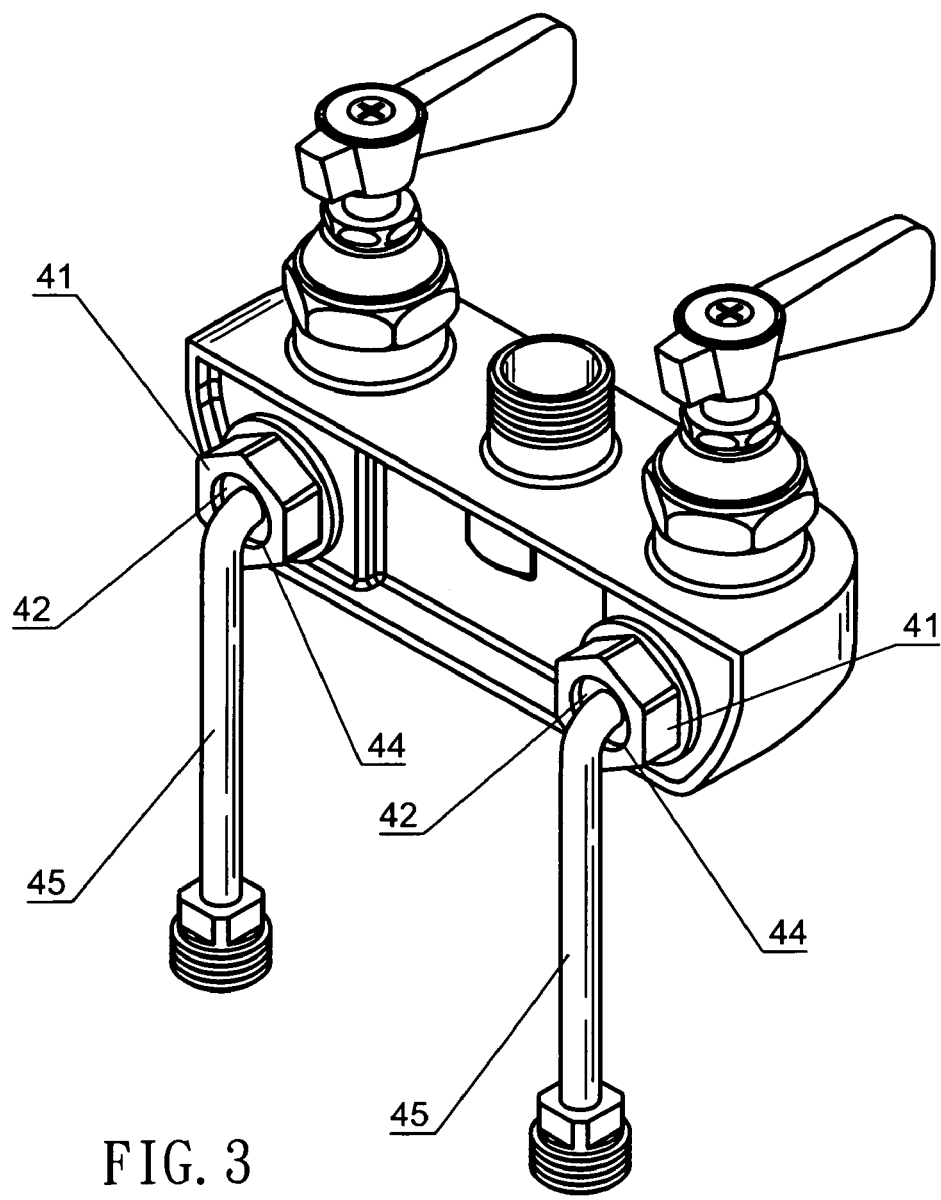
FIG. 3: the three-dimensional combination diagram of the present invention.

Referring to FIG. 2 and FIG. 3, the present invention is to put through locking ends 31 on both sides of water faucet 3 to connect the locking units 4 and position the water faucet 3 on the shutter S of the granite counter. In which the locking unit 4 is composed of two locking screw caps 41 to connect the locking ends 31 of the water faucet 3, two shims 42 and non-retunring pads 43 in the locking screw cap 41. The end and shims 42 are fixed and extrude to the feed pipe 45 through the perforation 44. And the locking screw cap 41 would be jointed closely with the non-returning pad 41 after being locked on the locking end 31 of the water faucet 3 to prevent the water's effusion from the locking end.

Figure 4:
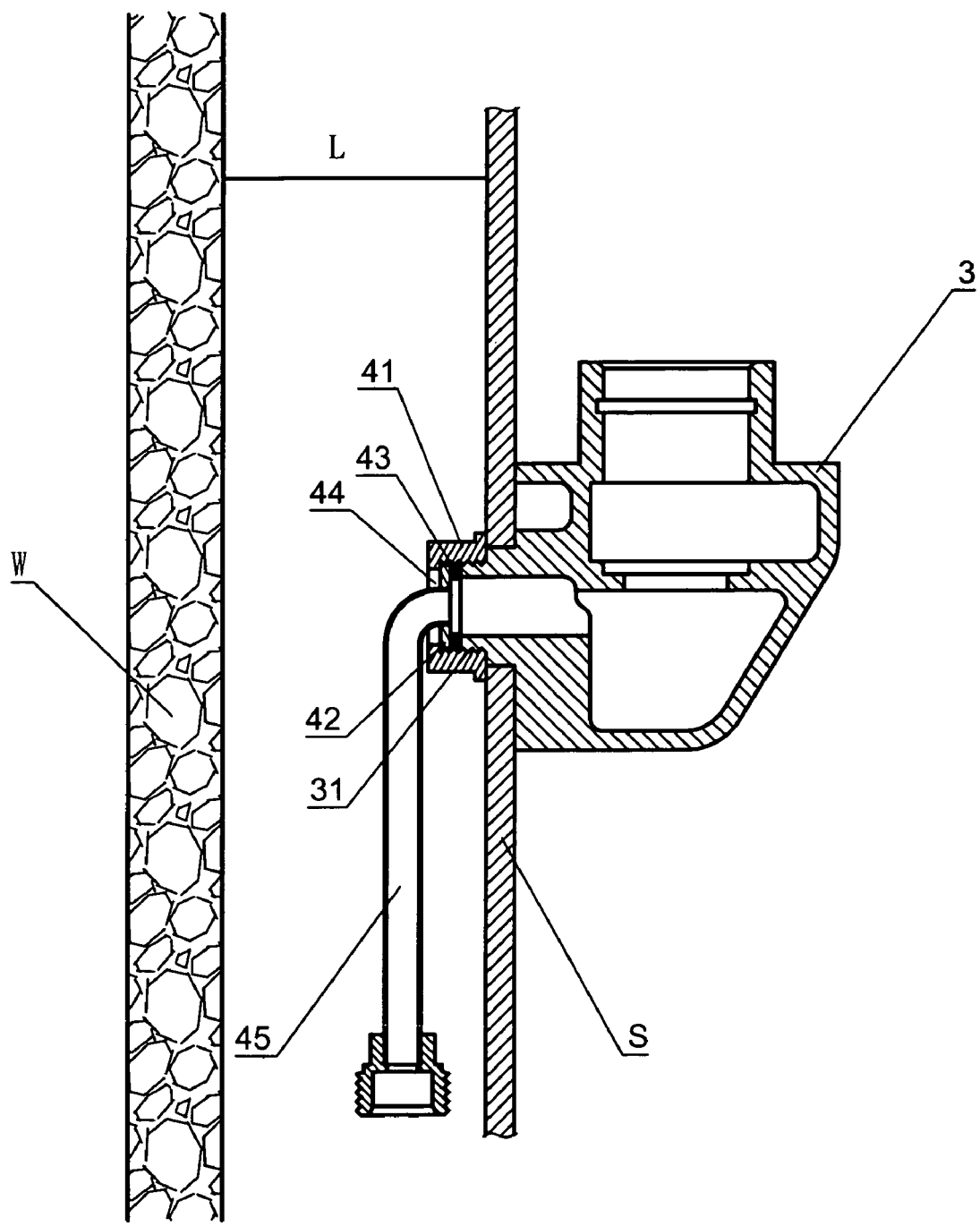
FIG. 4: the plane cutaway view of the present invention.

In addition, referring to FIG. 4, the water is guided vertically from the feed pipe 45 to the locking screw cap 41 and perforation 44, and then to the interior of the water faucet 3 through the locking end 31, and is stored in the water control loop of the water faucet for supply waiting; In accordance with the structure, because the locking unit 4 is designed direcly on the locking end 31 to make water can be guided directly and vertically to the locking screw cap 41 and perforation 44 and position the water faucet on the shutter S of the granite counter, the interval between the shutter S and wall W can be shortened properly for saving space and costs in connection materials.

What is claimed is:

1. A faucet assembly for a shutter of a granite counter comprising:
   a) a water faucet having two locking seats; and
   b) two locking units; each of the two locking units having:
      i) a locking screw cap having a perforation, one locking screw cap is threadedly connected to each of the two locking seats;
      ii) a shim, one shim is secured against each of the two locking seats by one locking screw cap; and
      iii) a feed pipe having an end connected to the shim, one feed pipe is inserted through the perforation of each locking screw cap,
   wherein an interior of each of the two feed pipes communicates with an interior of the water faucet.

2. The faucet assembly according to claim 1, wherein each of the two locking units includes a non-return pad located between the shim and each of the two locking seats.

* * * * *